US 8,794,912 B2

United States Patent
Nilsson et al.

(10) Patent No.: US 8,794,912 B2
(45) Date of Patent: Aug. 5, 2014

(54) STRUT AND A GAS TURBINE STRUCTURE COMPRISING THE STRUT

(75) Inventors: Martin Nilsson, Göteborg (SE); Hans Mårtensson, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 512 days.

(21) Appl. No.: 13/319,049

(22) PCT Filed: May 7, 2009

(86) PCT No.: PCT/SE2009/000230
§ 371 (c)(1),
(2), (4) Date: Dec. 21, 2011

(87) PCT Pub. No.: WO2010/128896
PCT Pub. Date: Nov. 11, 2010

(65) Prior Publication Data
US 2012/0093642 A1  Apr. 19, 2012

(51) Int. Cl.
*F01D 9/04* (2006.01)
*F01D 9/06* (2006.01)
*F02C 7/20* (2006.01)

(52) U.S. Cl.
CPC ............ *F01D 9/06* (2013.01); *Y02T 50/671* (2013.01); *F02C 7/20* (2013.01); *F01D 9/04* (2013.01)
USPC ....................... 415/191; 415/211.2; 415/210.1

(58) Field of Classification Search
CPC ................................. F01D 25/28; F01D 9/041
USPC ................ 415/191, 211.2, 142, 209.4, 210.1
See application file for complete search history.

(56) References Cited

U.S. PATENT DOCUMENTS

| | | | |
|---|---|---|---|
| 2,938,342 A | 5/1960 | Lombard et al. | |
| 5,259,183 A | 11/1993 | Debeneix | |
| 5,634,767 A * | 6/1997 | Dawson | 415/134 |
| 6,439,841 B1 * | 8/2002 | Bosel | 415/142 |
| 6,860,716 B2 * | 3/2005 | Czachor et al. | 415/142 |
| 7,594,404 B2 * | 9/2009 | Somanath et al. | 60/796 |

FOREIGN PATENT DOCUMENTS

| | | |
|---|---|---|
| EP | 0519823 A1 | 12/1992 |
| GB | 715486 A | 9/1954 |

OTHER PUBLICATIONS

International Search Report for corresponding Interrational Application PCT/SE2009/000230.
International Preliminary Report on Patentability for corresponding Interrational Application PCT/SE2009/000230.

* cited by examiner

Primary Examiner — Ninh H Nguyen
(74) Attorney, Agent, or Firm — WRB-IP LLP

(57) ABSTRACT

A strut for application between an outer ring and an inner ring in a gas turbine structure and a gas turbine structure including such a strut are provided. The strut includes an end portion which has a diverging shape so that an internal space is formed in the end portion for receiving at least part of an engine mount. Engine mounting lugs can be positioned at such struts.

38 Claims, 12 Drawing Sheets

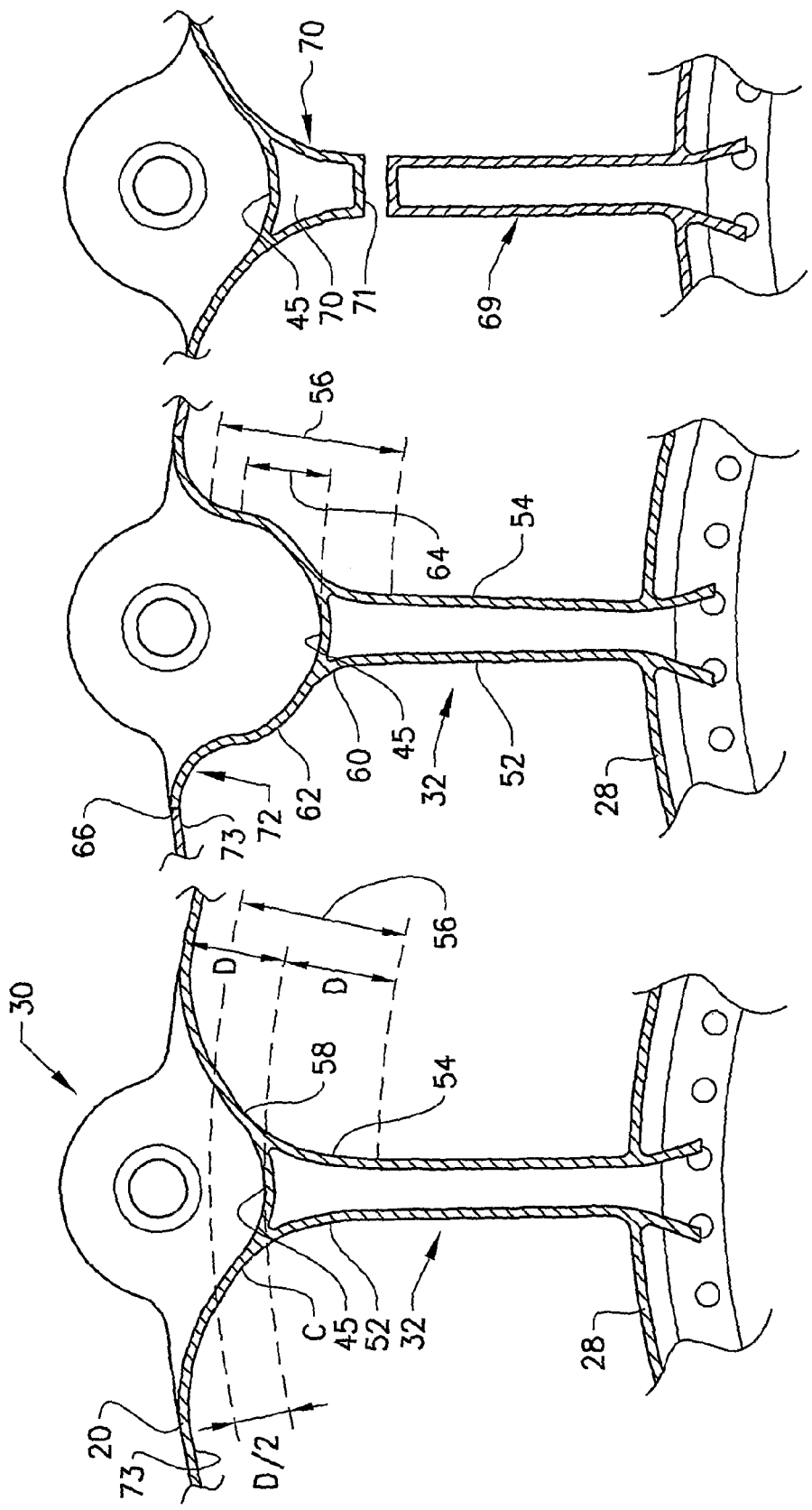

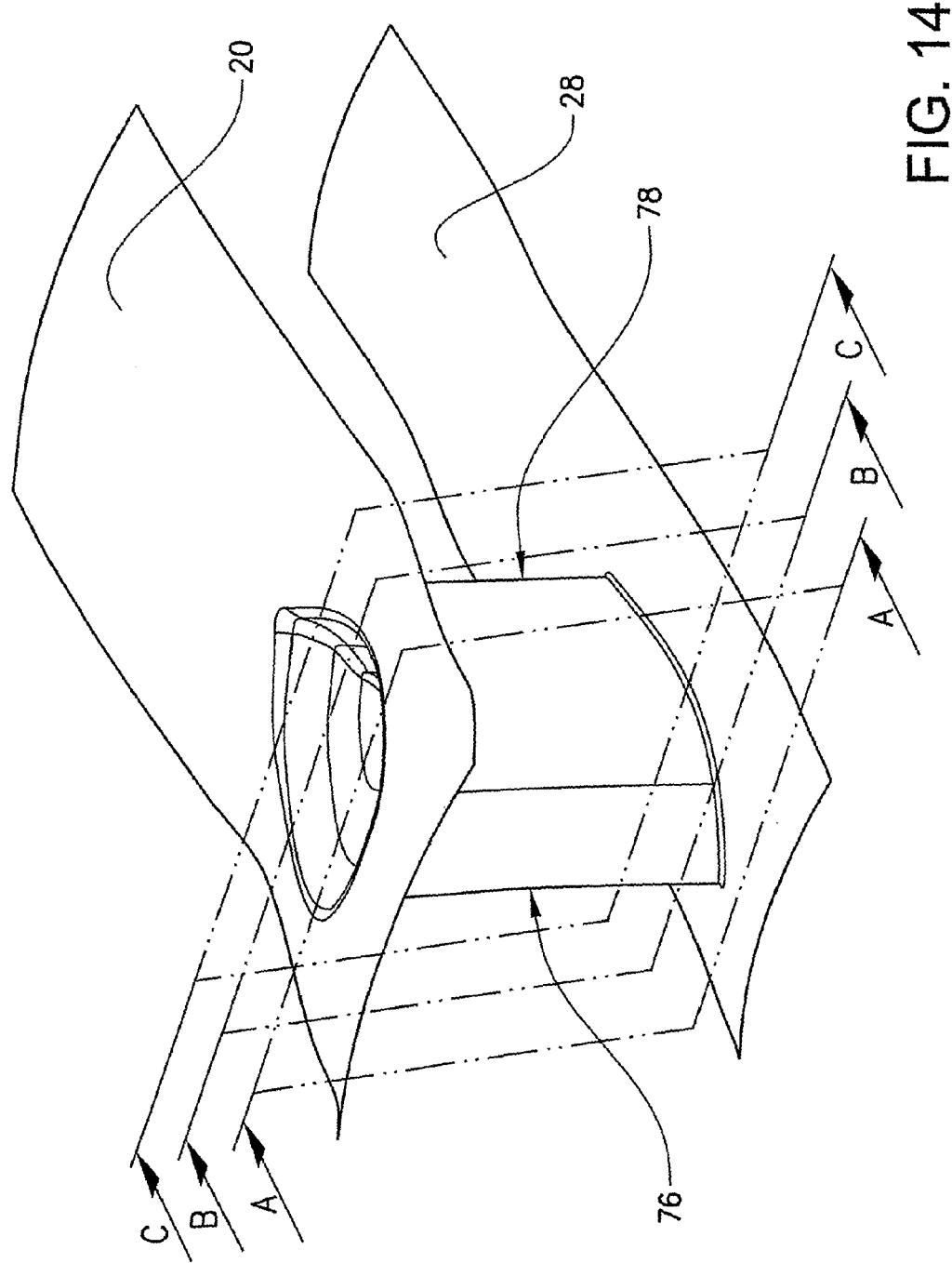

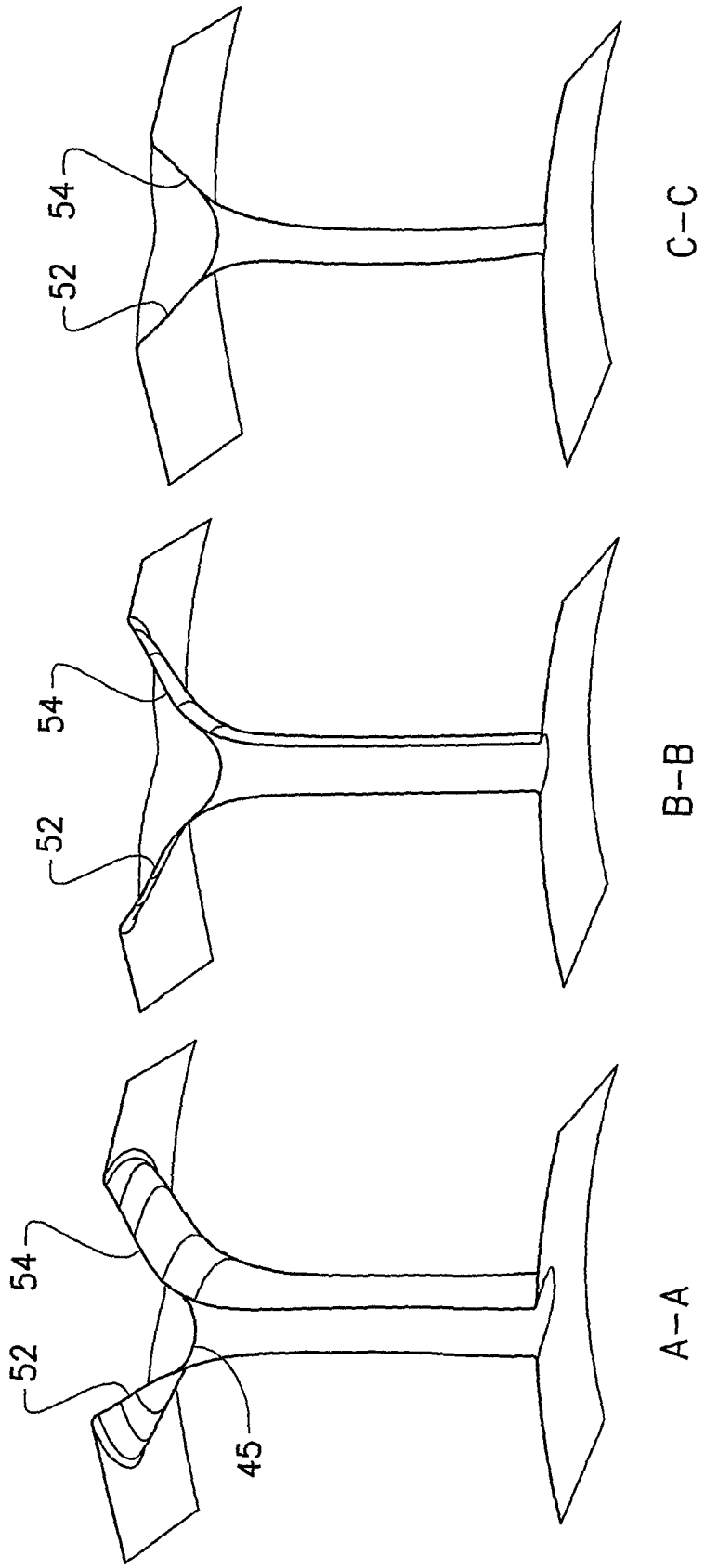

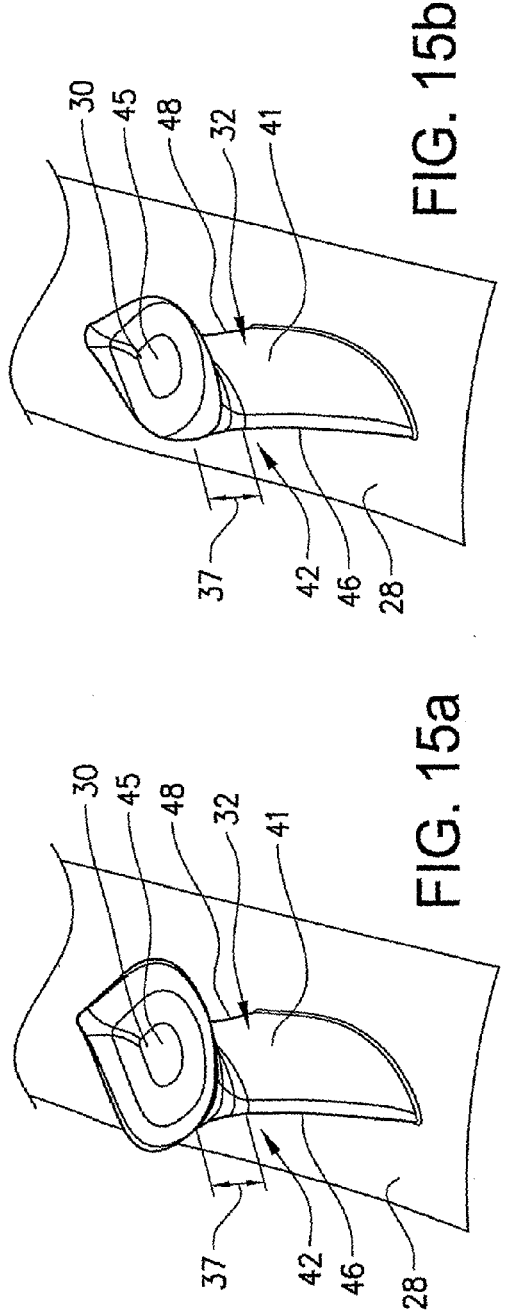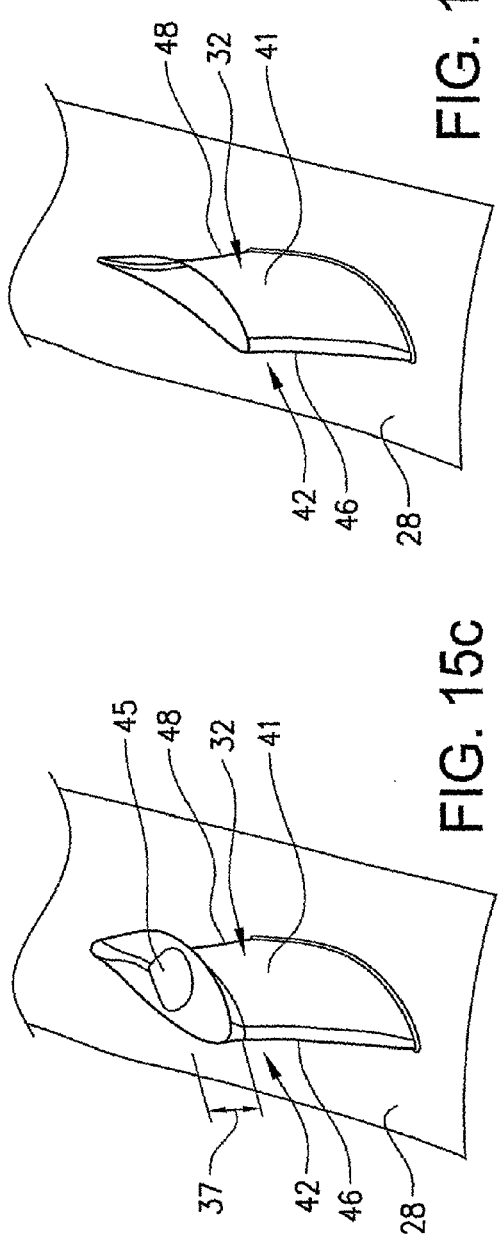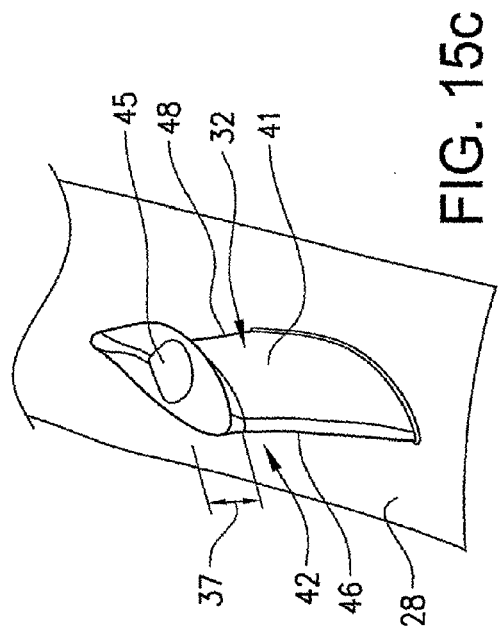

STRUT AND A GAS TURBINE STRUCTURE COMPRISING THE STRUT

BACKGROUND AND SUMMARY

The invention relates to a strut for application between an outer ring and an inner ring in a gas turbine structure. The invention also relates to a gas turbine structure comprising an outer ring, an inner ring and a plurality of circumferentially spaced struts extending between the inner ring and the outer ring.

A gas turbine engine may be used as a jet engine. The term jet engine includes various types of engines, which admit air at relatively low velocity, heat it by combustion and shoot it out at a much higher velocity.

Accommodated within the term jet engine are, for example, turbojet engines and turbo-fan engines. The invention will below be described for a turbo-fan engine, but may of course also be used for other engine types.

An aircraft engine of the turbofan type generally comprises a forward fan and booster compressor, a middle core engine, and an aft low pressure power turbine. The core engine comprises a high pressure compressor, a combustor and a high pressure turbine in a serial relationship. The high pressure compressor and high pressure turbine of the core engine are interconnected by a high pressure shaft. The high-pressure compressor, turbine and shaft essentially form a high pressure rotor. The high-pressure compressor is rotatably driven to compress air entering the core engine to a relatively high pressure. This high pressure air is then mixed with fuel in the combustor and ignited to form a high energy gas stream. The gas stream flows aft and passes through the high-pressure turbine, rotatably driving it and the high pressure shaft which, in turn, rotatably drives the high pressure compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. In civil applications most of the thrust produced is generated by the fan while in military applications most of the thrust produced is generated by the low and high pressure turbines. Engine frames are used to support and carry the bearings, which in turn, rotatably support the rotors. Conventional turbo fan engines have a fan frame, a mid-frame and an aft turbine frame. These frames constitute a gas turbine structure including an outer ring, an inner ring and a strut having a first end of the strut being attached to the ring and a second end being attached to the inner ring, the strut having first and second opposed strut faces being connected by a front edge and a rear edge.

In order to secure the gas turbine structure to a plane or another carrying structure which carries the gas turbine, the frame need to have mounting lugs to which links connecting the gas turbine to the plane or carrying structure must be present. Such mounting lugs are normally positioned in cup shaped indentations in an outer ring of the frame. The reason for arranging the mounting lug in an indentation of the outer ring is that forces transmitted in the plane of the outer ring should intersect at the mounting lug in order to eliminate that such forces generates a torque transfer via the lug to the link carrying the gas turbine. A strut is connected to each cup shaped indentation.

An example of a gas turbine structure is disclosed in U.S. Pat. No. 5,259,183. The indentations in the outer ring creates a disturbance to the gas flow through the turbine, which reduces the efficiency of the engine.

It is desirable to increase the efficiency of the gas turbine by reducing the disturbance on the gas flow through the turbine. The strut according to an aspect of the invention includes an end portion which has a diverging shape so that an internal space is formed in the end portion for receiving at least part of an engine mount. The invention, according to an aspect thereof, in particular relates to such struts at which engine mounting lugs are positioned.

In U.S. Pat. No. 5,259,183 the first and second opposed strut faces do not diverge in direction towards the ring. In U.S. Pat. No. 5,259,183 the strut is secured to a cup shaped indentation. The strut has a substantially uniform cross section along the radial extension of the strut. The strut is secured to the cup shaped indentation at the upper end of the strut. The joint between the strut and the indentation is a relatively sharp fillet radius. An area with a sharp fillet radius generates a local turbulent flow which has a negative impact on the disturbance on the gas flow through the turbine.

In contrast, a strut according to an aspect of the invention has an end portion of the strut with a diverging shape so that an internal space is formed in the end portion for receiving at least part of an engine mount. Due to the novel shape of the strut, the flow past the strut will be less disturbed. A particular reason for this is that the strut is free from fillet radius in between respective ends of the strut. Small radii of the outer surface of a strut, which radii are present in a flow channel where the struts may be mounted, will generate a distortion of the flow. The distortion of the flow may in turn lead to that an engine where the flow channel is included becomes less efficient. In particular small radii in an area that are somewhat distant to the ends of the struts at a connection between the strut and an inner and outer ring respectively will lead to flow distortion. Preferably, the diverging shape of the strut defines a smooth transition in direction from a center portion of the strut towards the strut end.

Hence the use of a strut according to an aspect of the invention in a flow channel will lead to reduced flow distortion in relation to prior art.

A strut may include first and second opposed strut faces being connected by a front edge and a rear edge. At the end portion of the strut, the strut faces are diverging in at least at central parts of the first and second opposed end faces. The strut faces are diverging in the direction toward an outer ring. By diverging the strut faces, at least at central parts of the opposed end faces, in the direction toward the outer ring, a smooth transition between the end faces and the connection of the strut to the outer ring can be accomplished. With central parts intended a central part of the strut with respect to an extension of the strut in a direction from a front edge to a rear edge of the strut. It may be sufficient to diverge the strut faces along this central part of the strut, which parts having a sufficient extension to make room for a recess adapted to accommodate component or a portion thereof such as typically an engine mount lug. It is therefore not necessary to diverge the strut faces at the front and rear edges of the strut where respective strut faces are connected. By arranging the strut faces to be diverging in the central parts, the strut is constructed with a geometry allowing an internal space, such as a recess, being arranged to receive a component or a portion thereof. The internal space is arranged at the end portion of the strut. The strut geometry thus has a reduced impact on the gas flow. This effect is achieved since the geometry of the strut according to an aspect of the invention to a lesser degree disturbs the gas flow through a flow channel where the strut may be mounted. For instance, the presence of a sharp fillet radius at a location in the vicinity of an inner end of a recess, which prior art solutions suffer from, is avoided.

The strut will have at least partially a curved shape. A cross section of the strut in a radial direction will thus have edge portion that diverge from each other in direction toward the end portion of the strut which houses the internal space. Each edge portion has the form of a curve which is diverging from a mid plane of the cross section. The curved shape may be concave or alternatively have both a concave and convex portion. By edge portion is intended an outer rim of the strut of a cross section through the strut.

The strut is provided with a smooth strut area. In the smooth strut area the curvature radius of edge portions of a cross section of the strut in a plane in the radial direction exceeds 0.15 L. Here L is the length of the strut. The length of the strut corresponds to the distance between an inner and an outer ring when the strut is mounted to connect the outer and inner ring. The invention, according to an aspect thereof, relates to a strut having a recess which is located in an end portion of the strut.

The recess is accessible externally of said outer ring in order to accommodate a component or part thereof. In particular the recess is arranged to receive a link for connection to a mounting lug present in the recess. The recess is having a depth D measured from a radius R of the outer ring, that is from an outer surface of the outer ring, to an inner end of said recess. The inner end of the recess is the location of the recess being closest to the inner ring. The distance is preferably measured in between two struts. In the event the outer ring and the inner ring have a conical shape, the depth D of the recess is measured at the location of the recess where the maximum distance in radial direction from the outer surface is present.

The smooth vane area is extending in the radial direction from a position located at a distance of D radially inside of the inner end to a position located at a distance of D/2 radially outside of said inner end.

Due to the requirement on the curvature imposed in the smooth vane area it is evident that no sharp fillet radius is present in the smooth strut area. The cross section may be taken along a length axis of the gas turbine structure or along a length extension of the strut that is a plane extending in the radial direction and being vertical to an axis extending from a front edge to a rear edge of the strut. The requirement imposed on the smooth vane area holds for both the cross section taken along the length axis of the gas turbine structure and the cross section taken across the length axis of the strut.

In an embodiment of the invention the edge portions are concave within said smooth strut area. This means that no inflection points at which the curvature radius change sign are present within said smooth strut area. The curvature radius may have its minimum value radially outside of said inner end of said recess and preferably within said smooth strut area. Furthermore a derivative of said curvature radius may be monotonously decreasing in a direction from the inner ring to the location of the minimum after which the curvature radius again may increase outwardly in a radial direction until the strut is connected with the outer ring. By forming the edge portions accordingly the smooth strut area is clearly void of any sharp structure which may have a negative impact on the gas flow through the turbine.

In another embodiment of the invention said edge portions changes from being concave to being convex within said smooth strut area. This enables the strut faces to more closely follow the form of the recess, while still fulfilling the requirement of keeping the smooth strut area void of any sharp structure. This enables reduction in consumption of material and may reduce the weight of the gas turbine structure. The curvature radius may have a minimum value in the smooth strut area at a location radially inside of said inner end of said recess. An inflection point at which said edge portions changes from being concave to being convex may be located within an inner end area extending from a location located D/6 radially inside said inner end of said recess to a location D/6 radially outside said inner end of said recess. The position of the inflection point at this location also enables the strut faces to closely follow the form of the recess. Furthermore a derivative of said curvature radius may be monotonously increasing outwardly in a radial direction in said smooth strut area up till said inflection point, at which the derivative will be decreasing. The curvature radius is thus decreased outwardly in the radial direction up to the location of the minimum value of the curvature from where the curvature radius increases up to the inflection point. After the inflection point, the curvature radius will be decreasing again. A second deflection point may be present in order to allow a smooth transition between the strut and the outer ring.

In order to further decrease the disturbance of the flow the smooth strut area may be increased in size to extend in the radial direction from a position located at a distance of 2D radially inside of said inner end to a position located at a distance of 4D/5 radially outside of said inner end. The smooth strut area may extend from the inner ring to the radius of the outer ring where the strut is connected to the outer ring.

The strut may be an integral structure including a recess formed at said first end of the strut, which recess is arranged to internally within the strut accommodate a component or a portion thereof.

In another embodiment the strut may be formed by connecting a lower strut portion to a top strut portion. The top strut portion is then constituted by a part containing the recess to accommodate the component. The division between the top strut portion and the lower strut portion may be formed at any location, but preferably radially inside of an inner end of the recess. The top strut part may be integral with the ring or a separate part connected to the ring. In the event a top strut portion including the recess is connected to a lower strut portion, regardless of whether the top strut portion is an integral part of the outer ring or a separate part connected to the ring, a smooth transition between the lower strut portion and separate body should preferably be present. Such smooth transition would fulfil the requirement of the strut faces stipulated above and the top strut portion would thus include portions of the strut faces referred to above. In this embodiment the strut has a length L which extends from the inner ring to the outer ring. For the purpose of this inventions the length L of the strut extends from the inner ring to the outer ring regardless of whether the strut is an integral piece or separate part or whether the strut is formed by connecting a lower strut portion with a top strut portion.

A joint between the strut and the ring may be positioned, in a radial direction, further from said inner ring than a bottom of said recess. By locating the joint between the strut and the outer ring as close to the radius of the outer ring as possible, that is a far from the inner ring as possible, the impact of any fillet radius present will be reduced. If the joint is located in the smooth strut area, the condition for the curvature radius imposed on the smooth strut area should be fulfilled. In the event the joint is located radially outside of the smooth strut area, the joint between the strut and outer ring may fulfil the condition for the curvature radius imposed on the smooth strut area. The outer ring would then form a continuous smooth surface at a sector including the location of the joint between the ring and the strut.

The invention, according to an aspect thereof, also relates to a gas turbine including strut as defined above.

BRIEF DESCRIPTION OF DRAWINGS

The invention will be explained in further detail below, with reference to embodiments shown on the appended drawings, wherein FIG. 4 shows a schematic drawing of an embodiment of one of the struts with diverging end faces in FIG. 3 in detail, FIG. 5 illustrates a schematic drawing of a cross section along the length axis of a strut according to an alternative embodiment of the invention, FIG. 6 shows a schematic drawing of a separate body which contains a recess, FIG. 14 shows a perspective view of a strut seen in a direction from an outer ring, FIGS. 14a-14c show cross sections through a strut taken at different axial locations, FIGS. 15a-15d show cross sections through a strut taken at different radial locations.

DETAILED DESCRIPTION

Figure 1:
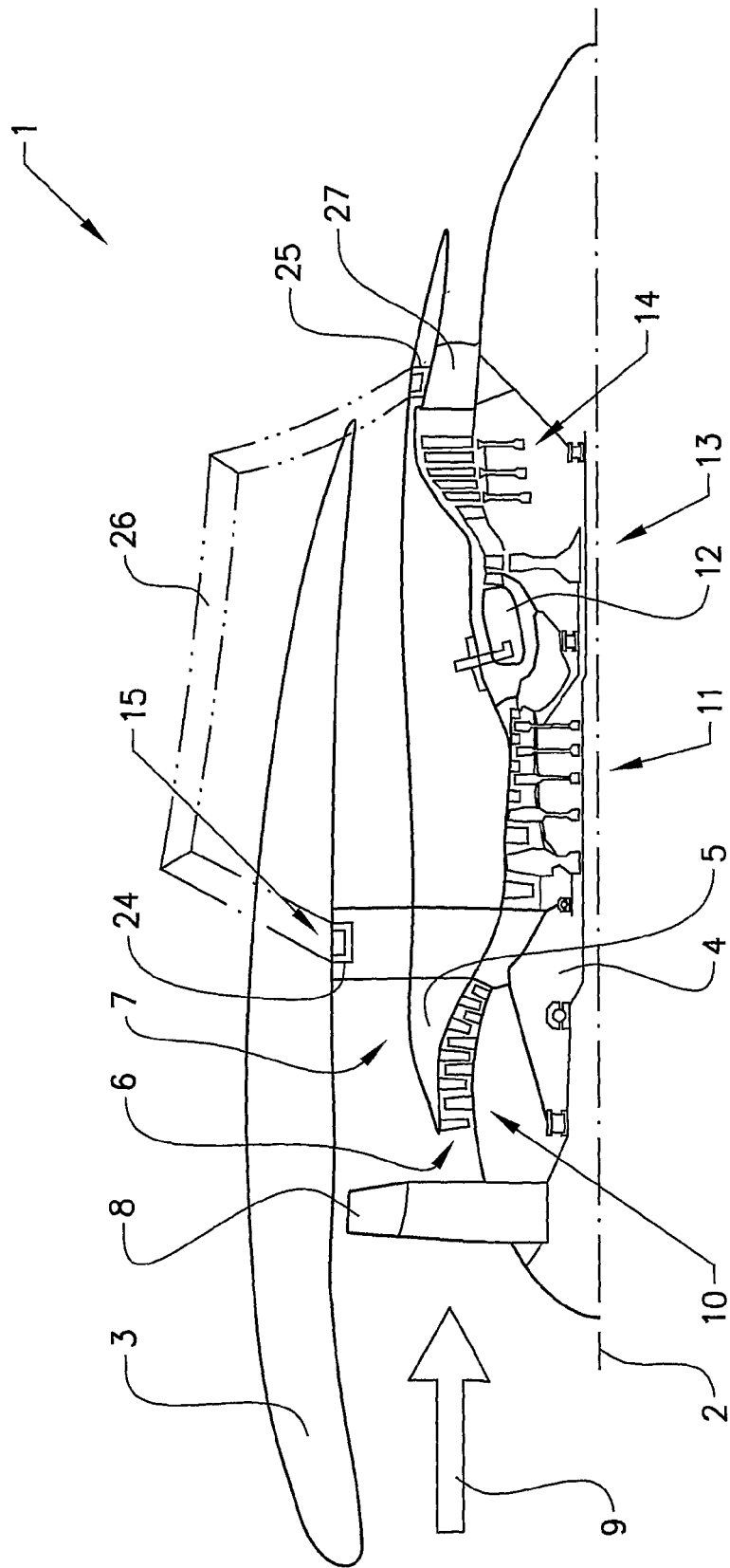
FIG. 1 illustrates an aircraft engine in a schematic cut side view.

The invention will below be described for a turbofan gas turbine aircraft engine 1, which in FIG. 1 is circumscribed about an engine longitudinal central axis 2. The engine 1 comprises an outer casing 3, or nacelle, an inner casing 4, and an intermediate casing 5, which is concentric to the first two casings and divides the gap between them into an inner primary gas channel 6, or core duct, for the compression of air and a secondary channel 7 in which the engine bypass air flows. Thus, each of the gas channels 6, 7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed coaxially with and radially inwardly of the high pressure rotor. A load carrying, torsionally rigid engine structure 15, in the following referred to as a static component, is arranged between the low pressure compressor 10 and the high pressure compressor 11 in the axial direction of the engine 1. The load carrying static component is also known as a case, housing or frame. The load carrying, torsionally rigid engine structure 15 is highly loaded during certain periods of a normal operating cycle of the engine.

The engine 1 is mounted to the aircraft (not shown) at a forwardly located fan frame forward mount 24 on the static component 15 and at a rearwardly located turbine frame aft mount 25 on the turbine frame. A mount system 26, normally comprising a pylon extending downwards from an aircraft wing and associated thrust links, is schematically indicated in FIG. 1. The mount system 26 is secured to the forward and aft mounts 24, 25.

Figure 2:
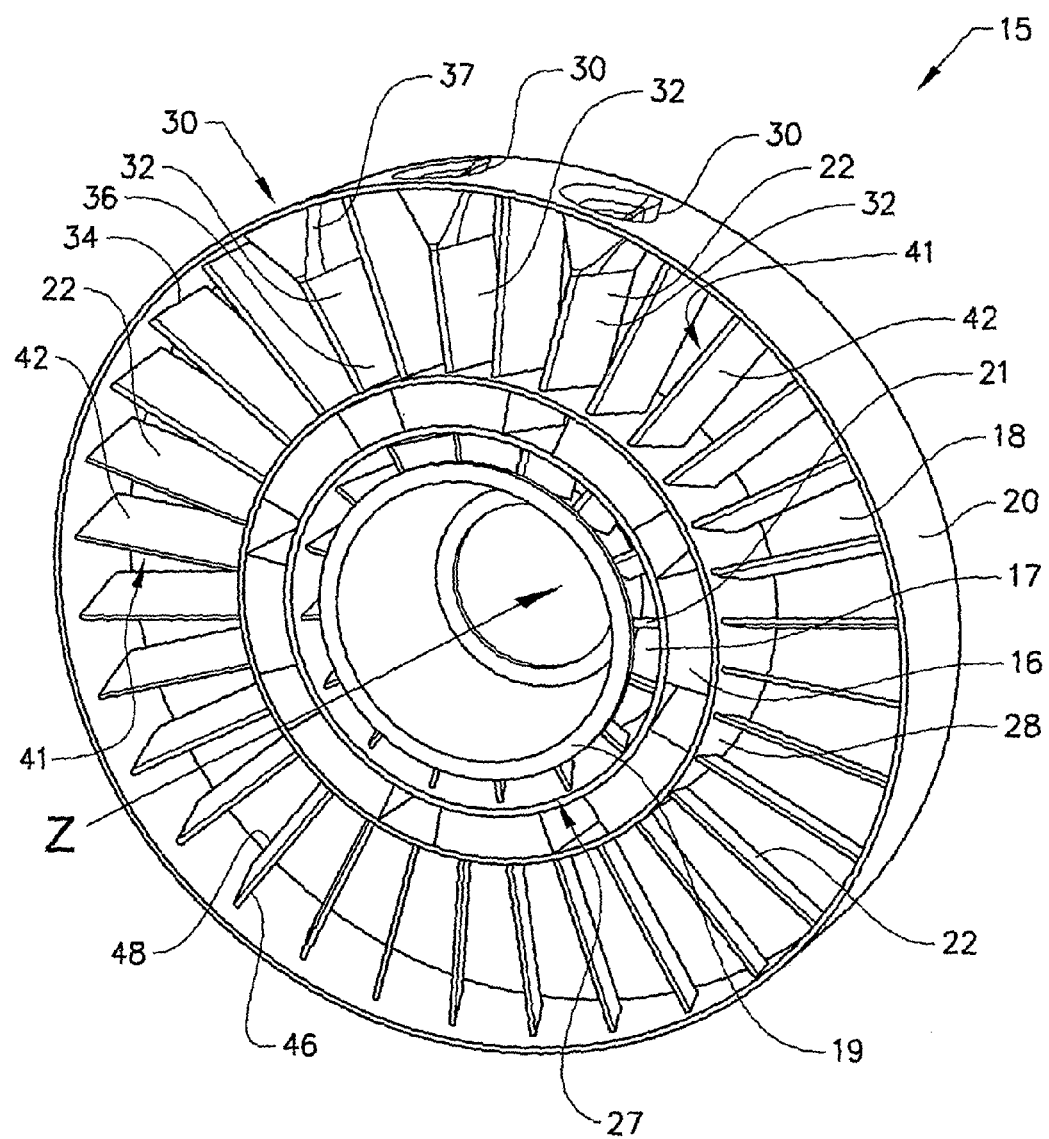
FIG. 2 illustrates a static gas turbine component for the aircraft engine in FIG. 1 in a perspective view.

FIG. 2 illustrates a perspective view of the load carrying, torsionally rigid engine structure 15. The load carrying, torsionally rigid engine structure is a static component. The static component 15 comprises an annular intermediate member, or splitter, 16, which defines inner and outer annular passages 17, 18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer ring 20 by a plurality of circumferentially spaced radial inner and outer struts 21, 22, or stator vanes. The inner support member 19, the outer ring 20 and the annular intermediate member 16 are coannular. Opposite ends of the inner struts 21 are rigidly connected to the inner annular member 19 and the intermediate member 16 for transmitting structural loads between said members. Opposite ends of the outer struts 22 are rigidly connected to the intermediate member 16 and the outer annular member 20 for transmitting structural loads between said members. The air is forced rearwardly through openings between adjacent struts 21, 22.

The annular intermediate member 16 comprises an outer annular member 28 and an inner annular member 27 of metal material, which defines the outer passage 18 and the inner passage 17, respectively.

On the outer ring 20 internal spaces in the form of a first, a second and a third recess 30 are shown. The recesses are adapted to accommodate a component or part thereof, such as an engine mount lug. The static component 15 includes an inner ring 28 formed by the outer annular member 28 of the annular intermediate member 16. Struts 22 having a first end 34 of the strut being attached to the outer ring 20 and a second end 36 being attached to the inner ring 28. The drawing furthermore indicates that at an end portion 37 of a set of struts 32 which houses the internal spaces has first and second opposed strut faces 41, 42 which diverges in a circumferential direction with an increased radial distance to the inner ring 28. The strut faces diverges 41, 42 in at least a central portion in an axial direction z of the static component 15. The central portion should be sufficiently large in order to admit the recesses 30 to be present in the end portion 37 of the strut.

Figure 3:
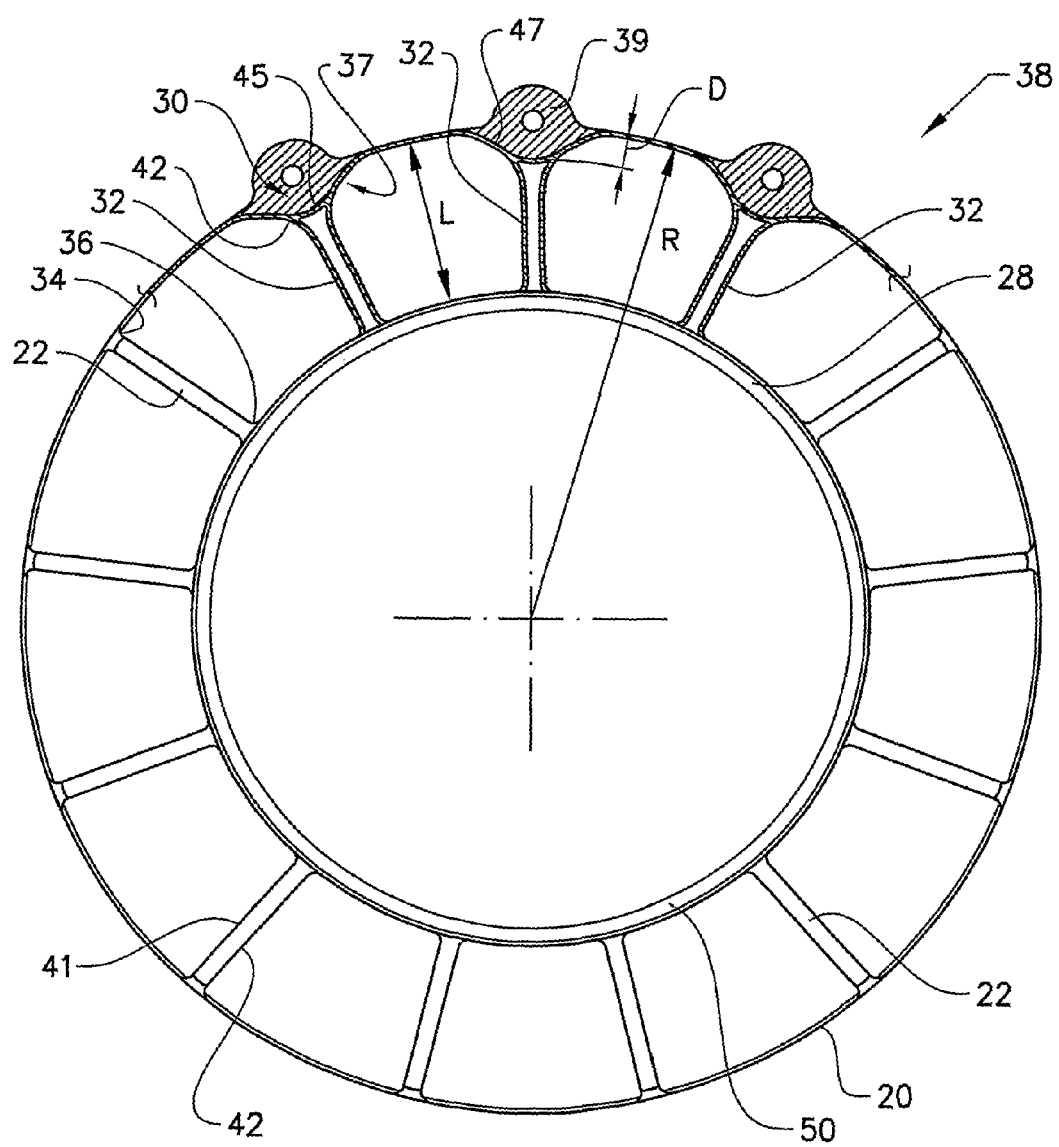
FIG. 3 illustrates a cross section along the length axis of a gas turbine structure including set of struts according to the invention.

In FIG. 3, a cross section perpendicular to the length axis of a gas turbine structure 38 is shown. The gas turbine structure 38 may be a part of the static component 15 shown in FIG. 2. The gas turbine structure 38 includes the outer ring 20, the inner ring 28 formed by the outer annular member 28 of the annular intermediate member 16 and a set of struts 22. Each strut includes a first end 34 of the strut being attached to the outer ring 20 and a second end 36 being attached to the inner ring 28. The strut having first and second opposed strut faces 41, 42 being connected by a front edge 46 (FIG. 2) and a rear edge 48 (FIG. 2). Among struts 22 connecting the outer ring 20 with the inner ring 28, a set of struts 32 includes at the end portion 37 of the struts in the set at least a central portion in an axial direction z of the gas turbine structure of said first and second opposed strut faces 41, 42 where the strut faces 41, 42 diverges in direction towards the outer ring 20.

A recess 30 is located in an end portion 37 of said strut. The end portion 37 may be an integral part of the strut, a separate part being connected to the outer ring 20 or constitutes a part of the outer ring 20. The recess 30 is accessible externally of said outer ring 20. The strut end portion 37 comprises a wall 47 which is continuous around said internal space forming the recess. An engine mount lug 39 is mounted in the recess 30. The recess 30 has a depth D measured from an outer surface of the outer ring 20 to an inner end 45 of said recess 30. The strut 32 has a length L measured from the inner ring 28 to the outer ring. The length L of the strut 32 should be measured at a mid position in between two neighbouring struts. The radius is measured as the outer diameter of the outer ring 20. The length of the strut is thus measured from the outer surface 50 of the inner ring to an inner surface 73 of the outer ring. In the event the outer ring 20 and the inner ring 28 have a conical shape in, the length of the strut is measured at the cross section where the requirement of the diverging strut faces are studied.

The embodiments shown in FIGS. 4-6 will be described in greater detail below. FIGS. 4-6 are schematic and intended to illustrate the principles of the invention. The drawings are not to scale, which means that the actual shape of a smooth strut area can not be directly derived from the figures. Instead FIGS. 8, 9 and 12-15 more clearly show the geometry of the struts. In particular FIGS. 12-15 are CAD drawings showing the shape of an embodiment of the struts in a fashion where the actual geometry is apparent.

In FIG. 4, one of the struts 32 with diverging end faces in FIG. 3 is shown in greater detail. In FIG. 4, the cross section is across the length axis of the gas turbine structure. The cross section of the strut 32 is delimited by edge portions 52, 54 extending from the inner ring 28 to the outer ring 20. The strut is provided with a smooth strut area 56 extending in the radial direction from a position located at a distance of D radially inside of the inner end 45 to a position located at a distance of D/2 radially outside of the inner end 45 A curvature radius C of edge portions 52, 54 of the cross section of the strut in the plane extending in the radial direction exceeds 0.15 L. In the embodiment shown in FIG. 4, the edge portions 52, 54 are concave within said area. This means that no inflection points at which the curvature radius changes sign exists within said area. The curvature radius may have its minimum value at a location 58 radially outside of said inner end 45 of said recess. Furthermore, a derivative C of said curvature radius C is monotonously increasing outwardly in a radial direction in the smooth strut area 56. The derivative C thus increases for locations being more distant from the inner ring. By forming the edge portions accordingly the smooth strut area is clearly void of any sharp structure which may have a negative impact on the gas flow through the turbine.

The cross section may be selected to be either across the length axis of the gas turbine structure or across the length extension of the strut. The length extension of the strut is a direction in a direction from a front edge of the strut to a rear edge of the strut, which direction is perpendicular to the radial direction. In the event the length extension varies with the radial location, a mean value of the length extension may be used as the direction defining the normal to the plane extending in the radial direction which plane forms a cross section through the strut. The actual requirement of the curvature radius of the edge portions is imposed on the cross section of these two cross sections which give a minimal curvature radius of the edge portions. The requirement that the curvature radius exceeds 0.15 L ensures that the smooth strut area is clearly void of any sharp structure in the selected plane.

In FIG. 5, a cross section across the length axle of the gas turbine structure according to an alternative embodiment of the invention is shown. In this embodiment edge portions changes from being concave to being convex once within the smooth strut area. This enables the strut faces to more closely follow the form of the recess, while still fulfilling the requirement of keeping the smooth strut area void of any sharp structure. This enables reduction in consumption of material and may reduce the weight of the gas turbine structure. The curvature radius may have its minimum value at a location 60 radially inside of said inner end 45 of the recess 30. An inflection point 62 at which said edge portions changes from being concave to being convex may be located within an inner end area 64 extending from a location located D/6 radially inside said inner end 45 of the recess to a location D/6 radially outside the inner end 45 of said recess. The position of the inflection point 62 at this location also enables the strut faces to closely follow the form of the recess. Furthermore a derivative of said curvature radius C is monotonously increasing outwardly in a radial direction in said smooth strut area.

The smooth strut area may be enlarged to extend in the radial direction from a position located at a distance of 2D radially inside of said inner end to a position located at a distance of 4D/5 radially outside of said inner end. The smooth strut area may be further enlarged to extend from the inner ring to the outer ring.

The strut 32 may be an integral structure including a recess 30 formed at a first end 34 of the strut, which recess 30 is arranged to internally within the strut accommodate a component or a portion thereof. If the strut is an integral structure a joint 66 between the strut and the outer ring 20 is positioned, in a radial direction, further from said inner ring 28 than a bottom or inner end 45 of said recess.

In FIG. 5 a joint 66 between the outer ring and the strut is located in a plane of the outer ring. In this event the strut may be joined to the outer ring 20 comprising a radial opening such that an internal space in the end portion 37 of the strut 32 faces the radial opening 30 of the outer ring 20. An engine mount 39 may be positioned in the internal space of the strut.

The strut may alternatively be formed by a lower strut portion and a top strut portion. The top strut portion is then a part containing the recess to accommodate the component or part thereof may be a separate body connected to the outer ring or an integral part of the outer ring. FIG. 6 shows separate body 70 to which a lower strut portion 69 is to be connected in order to complete the strut. This separate body 70 may be integral with the outer ring 20 or connected to the ring. A joint 71 between the separate body and a lower strut portion 69 is then positioned at a location radially inside of the inner end 45. In the shown embodiment a separate body 70 including the recess 30 is used. A smooth transition between the lower strut portion 69 and separate body 70 is present at said joint 71. In the event the joint is present in the smooth strut area or radially inside of said smooth strut area, the smooth transition would fulfil the requirement of the strut faces stipulated above. The separate body would thus include portions of the smooth strut area.

An inner surface 73 of the outer ring 20 may form a continuous smooth surface at a sector 72 including the location of the joint 66 between the outer ring 20 and the strut 32. This means that at the joint 66 between the outer ring 20 and the strut 32 (FIG. 4), may be free from fillet radius at the inner surface 73 of the outer ring.

In the embodiments shown, the wall of the outer ring is slender in relation to a circumferential thickness of the strut. The edge portions of the strut in a cross section of the strut in a plane in the radial direction may be concave at transition points where the first and second opposed strut faces are arranged to mate with the outer ring. The engine mount lug may be positioned in circumferential direction between transition points of the first and second opposed strut faces. The edge portions of a cross section through the first and second opposed strut faces may be shaped as a segment of an ellipse, where said segment preferably has an open angle of between 60° and 90°.

The gas turbine structure described in relation to FIGS. 3-6 may be part of the static engine component 15 shown in FIG. 2, where the inner ring 28 is constituted by the outer annular member 28 of annular intermediate member 16, or by a part of turbine rear frame 27 (FIG. 1).

Figure 7:
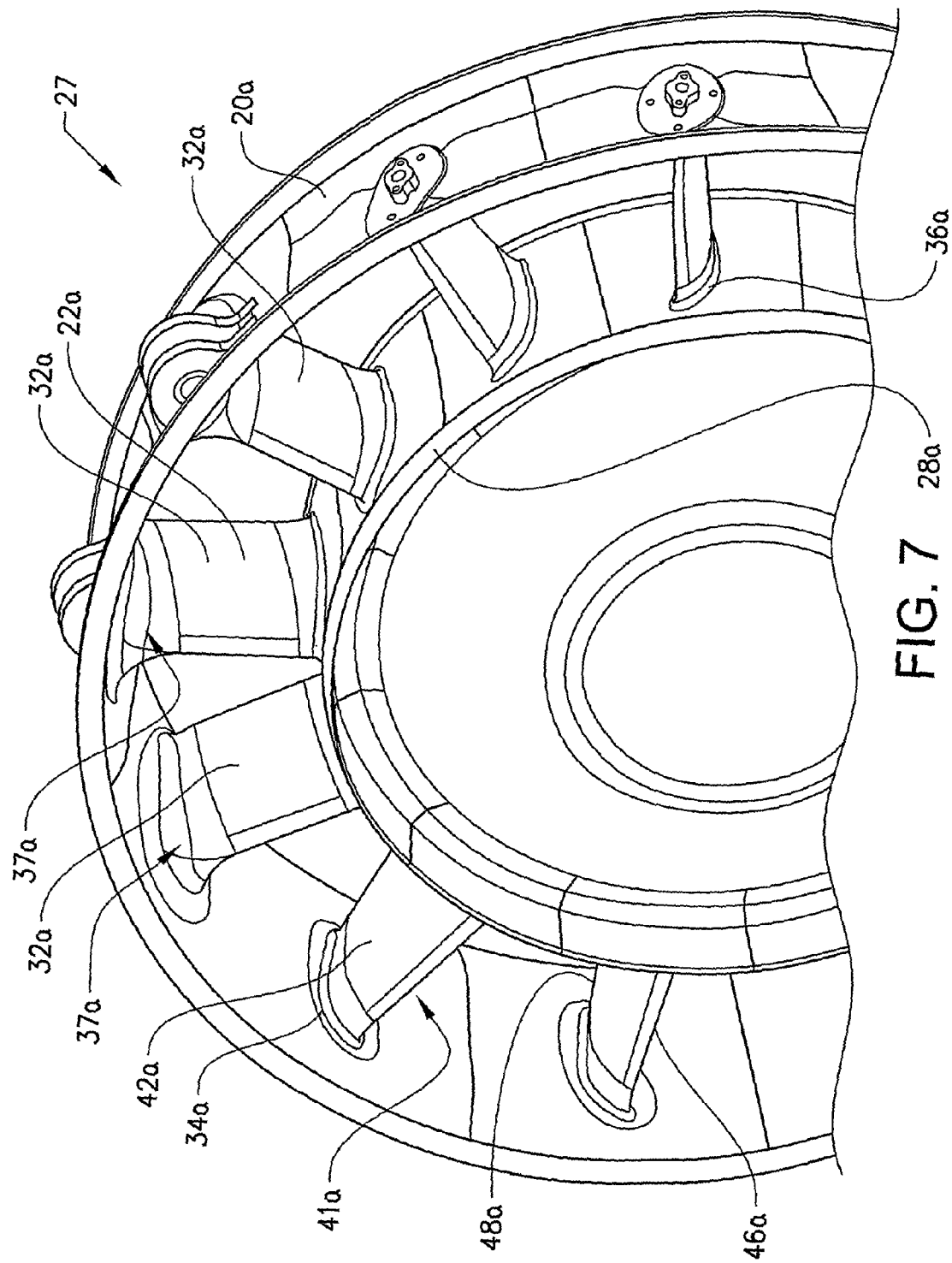
FIG. 7 shows a perspective view of a turbine rear frame being formed as a gas turbine structure according to the invention.

A turbine rear frame 27 being formed as a gas turbine structure according to the invention is shown in a perspective view in FIG. 7. The turbine rear frame 27 includes an outer ring 20a, an inner ring 28a and a set of struts 22a connecting the inner ring with the outer ring. Each strut includes a first end 34a of the strut being attached to the outer ring 20a and a second end 36a being attached to the inner ring 28a. Each strut has a first and a second opposed strut faces 41a, 42a being connected by a front edge 46a and a rear edge 48a. Among struts 22a connecting the outer ring 20a with the inner ring 28a, a set of struts 32a includes at the end portion 37a of the struts in the set, where, at least in a central portion in an axial direction z of the gas turbine structure of said first and second opposed strut faces 41a, 42a, the strut faces 41a, 42a diverges in direction towards the outer ring 20a.

Figure 8:
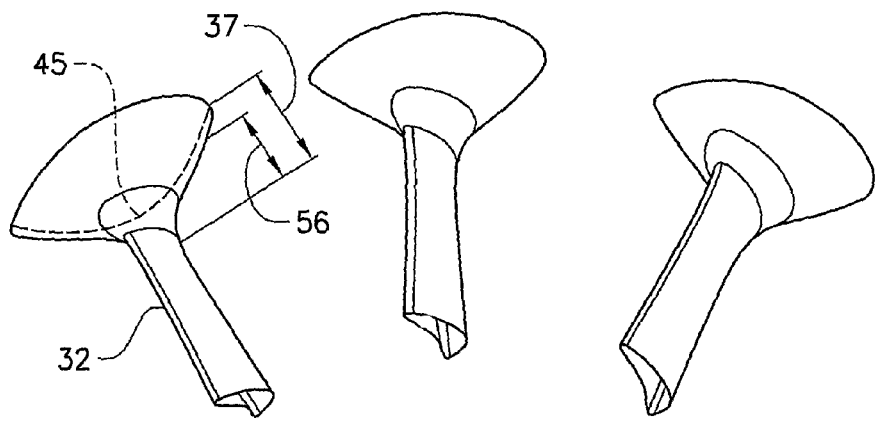
FIG. 8 shows a perspective view of three struts according to a first embodiment of the invention.

FIG. 8 shows a perspective view of three struts 32 having an end portion 37 with first and second opposed strut faces which are diverging in a circumferential direction toward the outer ring (not shown). The struts includes a smooth strut area 56 extending in the radial direction from a position located at a distance of D radially inside of an inner end 45 to a position located at a distance of D/2 radially outside of the inner end 45. Edge portions of a cross section of the strut in a plane in the radial direction are concave within the smooth strut area.

Figure 9:
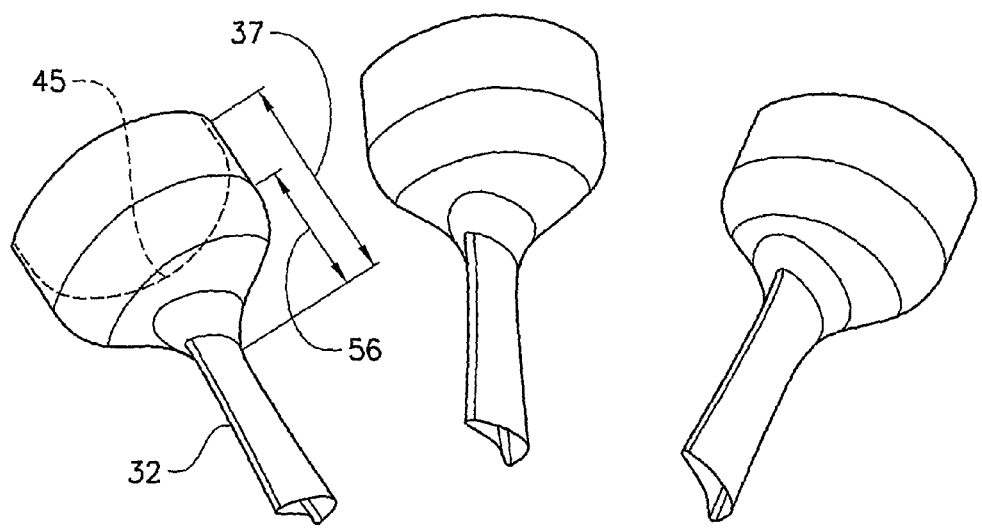
FIG. 9 shows a perspective view of three struts according to a second embodiment of the invention.

FIG. 9 shows a perspective view of three struts 32 having an end portion 37 with first and second opposed strut faces which are diverging in a circumferential direction toward the outer ring (not shown). The struts includes a smooth strut area 56 extending in the radial direction from a position located at a distance of D radially inside of an inner end 45 to a position located at a distance of D/2 radially outside of the inner end 45. Edge portions of a cross section of the strut in a plane in the radial direction are shifts from being concave to being convex once within the smooth strut area. The shift from being concave to being convex occurs at an inflexion line 43.

Figure 10:
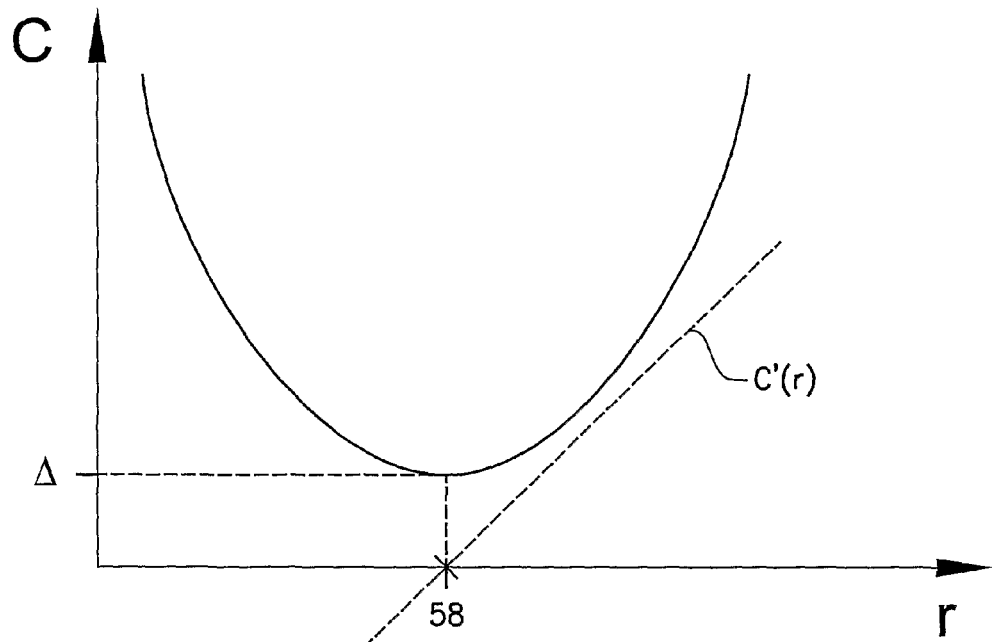
FIG. 10 shows a diagram of the curvature radius and a derivative of the curvature radius as a function of the radial position of the embodiment shown in FIG. 4.

FIG. 10 shows a diagram of the curvature radius C and a derivative C of the curvature radius as a function of the radial position r of the embodiment shown in FIG. 4. As is evident from the diagram the curvature radius decreases toward a minimum. The minimum would correspond to the position 58 indicated in FIG. 4. Thereafter the curvature radius would increase again toward the connection between the strut and the outer ring. The derivative of the curvature radius increases monotonically from a position close to the inner ring toward the connection to the outer ring. The minimum of the curvature radius C within the smooth strut area does not fall below a minimum Δ, which exceeds 0.15 L.

Figure 11:
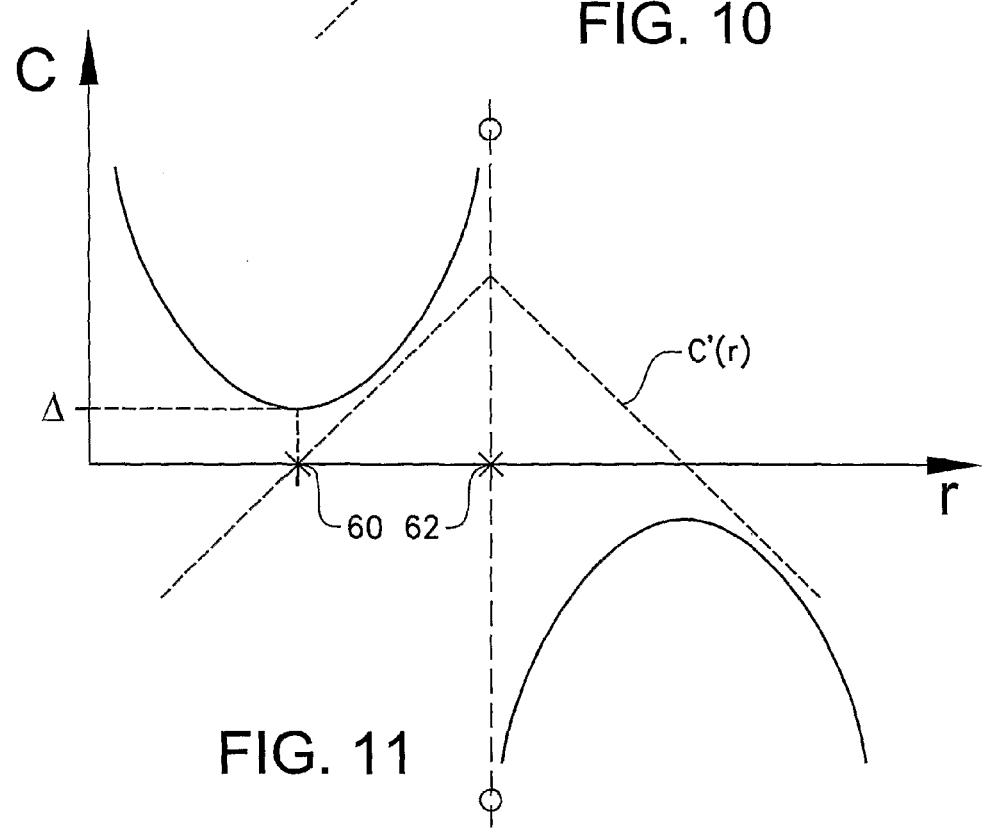
FIG. 11 shows a diagram of the curvature radius and a derivative of the curvature radius as a function of the radial position of the embodiment shown in FIG. 5.

FIG. 11 shows a diagram of the curvature radius C and a derivative C of the curvature radius as a function of the radial position r of the embodiment shown in FIG. 5. As is evident from the diagram the curvature radius decreases toward a minimum. The minimum would correspond to the position 60 indicated in FIG. 5. Thereafter, the curvature radius increases again toward an inflection point located in the smooth strut area. This corresponds to the position 62 indicated in FIG. 5. After the inflection point, the curvature radius decreases in direction toward the connection between the strut and the outer ring. In order not to generate a sharp connection with the outer ring, a second inflection point can be located close to the outer ring in order to provide for a smooth transition between the strut and the outer ring. The derivative of the curvature radius increases monotonically from a position close to the inner ring toward the inflection point. At the inflection point the derivative decreases toward the outer ring. If a second inflection point is present, the derivative will again start to increase in order to provide for a smooth transition at the joint to the outer ring. The minimum of the curvature radius C does not fall below a minimum Δ, which exceeds 0.15 L.

Figure 12:
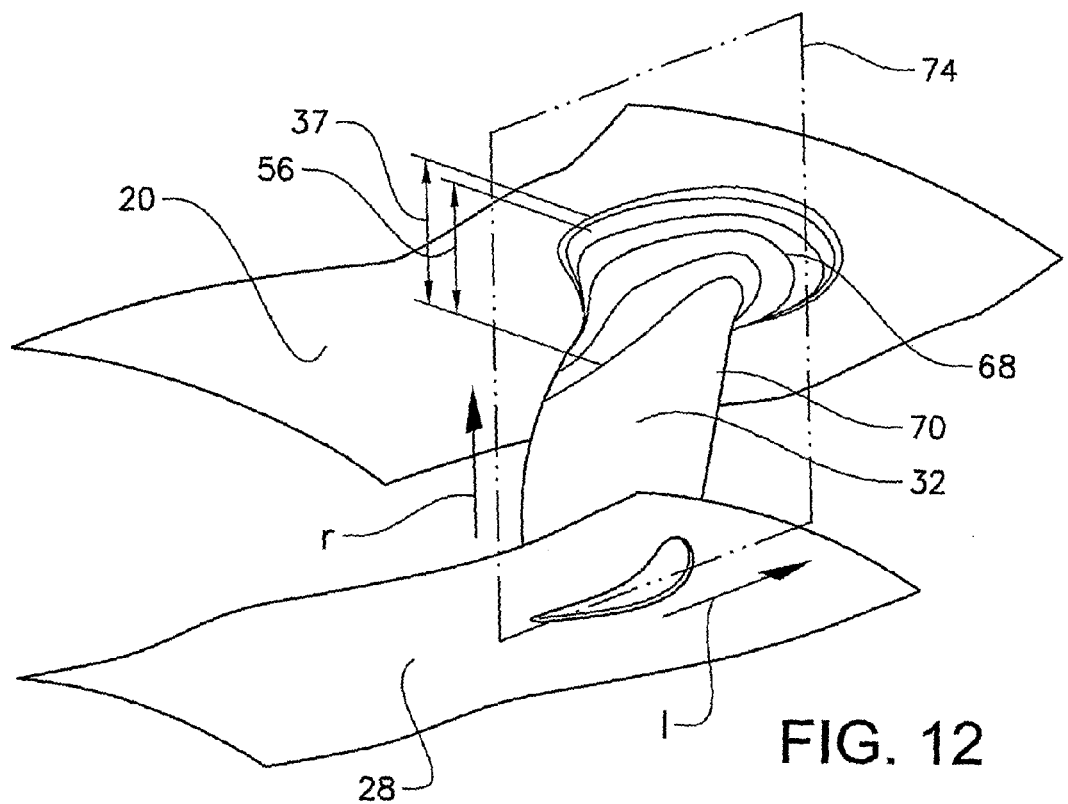
FIG. 12 shows a perspective view of a strut seen in a direction from a first strut face and from an inner ring.
Figure 13:
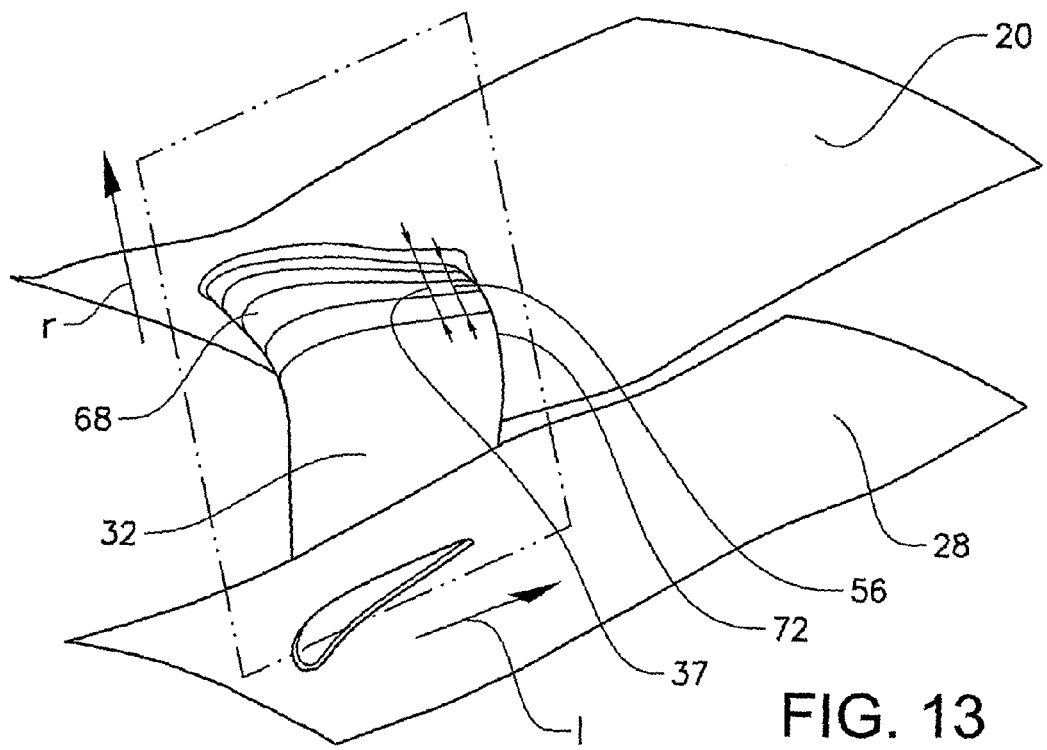
FIG. 13 shows a perspective view of a strut seen in a direction from a second strut face and from an inner ring

FIG. 12 shows a perspective view of a strut 32 seen in a direction from an inner ring 28. Part of the inner ring 28 and part of the outer ring 20 are indicated in the figure. In an end portion 37 of the strut a smooth strut area 56 is indicated via a set of lines 68. The view is further taken from a heading face 70 of the strut which is directed in an up wind direction when mounted in a gas turbine. FIG. 13 shows a perspective view of a strut 32 seen in a direction from an inner ring 28. Part of the inner ring 28 is indicated in the figure. In an end portion of the strut a smooth strut area 56 is indicated via a set of lines 68. The view is further taken from a tail face 72 of the strut which is directed in a down wind direction when mounted in a gas turbine. The FIGS. 12 and 13 together with the lines 68 illustrate the geometry of the smooth strut area. As may be understood from a comparison of FIGS. 12 and 13, the smooth strut area is not necessarily symmetric with respect to a plane 74 in the radial direction extending through the tail face and the heading face. The plane is thus extending in a radial direction r and in a length direction l of the strut. In particular it is understood that the recess may be off centred in relation to the plane 74. In the embodiment shown in FIGS. 12 and 13, the recess is located predominantly on the side of the plane 74 which is located on the convex side of the strut.

FIG. 14 shows a perspective view of a strut 32 seen in a direction from an outer ring 20. Part of the inner ring 28 and part of the outer ring 20 are indicated in the figure. A series of cross-sections taken at the positions A, B, C and D illustrates the geometry of the smooth strut area. The cross section taken at the position B illustrates a cross section vertically to a length direction of the strut and at a mid position between a nose 76 and a tail 78 of the strut. The cross section taken at the position A illustrates a cross section vertically to a length direction of the strut and forward of a mid position between the nose 76 and the tail 78 of the strut. The cross section taken at the position C illustrates a cross section vertically to a length direction of the strut and aft of a mid position between the nose 76 and the tail 78 of the strut. The cross section taken at the position D illustrates a cross section in a length direction of the strut said cross section running through the nose 76 and the tail 78 of the strut.

In FIGS. 14a-14c the geometry of the strut taken at various cross sections is shown. It may be noted that the curvature radius curvature radius C of edge portions 52,54 of the cross sections of the strut as shown in FIGS. 14a-14c, in the smooth strut area 56 exceeds 0.15 L. The cross sections shown in FIGS. 14a-14c are taken at a plane which is vertical to the length extension of the strut and extends in the radial direction. The smooth strut area extends from a position located at a distance of D radially inside of an inner end 45 of a recess to a position located at a distance of D/2 radially outside of the inner end 45. Here D is selected as the depth of the recess, which equals the distance from the outer ring to the inner end of the recess.

Figure 15:
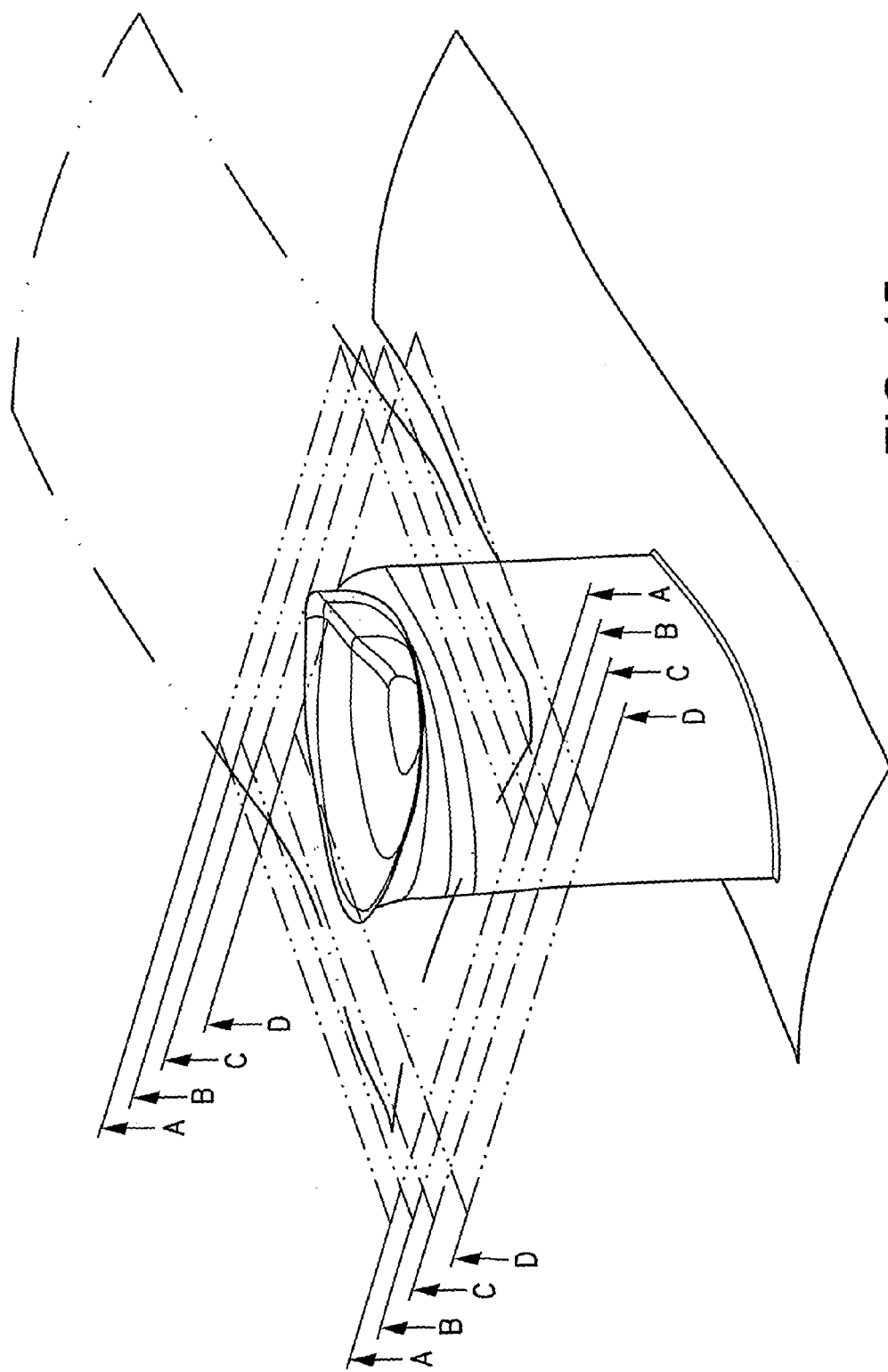
FIG. 15 shows a perspective view of a strut seen in a direction from an outer ring.

FIG. 15 shows a perspective view of a strut 32 seen in a direction from an outer ring 20. A series of cross-sections taken at different radial locations A, B, C and D illustrates the geometry of the smooth strut area. FIGS. 15a-15d illustrates how a radial cross section of the gradually changes shape from a crescent to become more oval in order to give room for a recess in the strut. It may be noted that the curvature radius at the nose of the strut for the radial cross section increases substantially from the cross section below the smooth strut area shown in FIG. 15d to the cross section in an upper part of the smooth strut area shown in FIG. 15a. The cross sections of the strut 32 at different radial locations all include a somewhat rounded front edge 46 and a relatively sharp rear edge 48 connected by strut faces 41, 42. Each cross section is aerodynamically shaped to induce as little turbulence as possible to the flow. In the end portion 37 of the strut the side faces 41 are gradually diverging to make room for the internal space 30. The front edge 46 is translated in the forward direction and the rear edge 48 is translated in the rearward direction making the strut longer for cross sections closer to the outer ring 20. In this manner room for the recess is enabled while maintaining an aerodynamic air foil geometry of a cross section of the strut in the direction shown in FIGS. 15a-15d. The aerodynamic air foil geometry is characterised by the presence of a rounded front edge, a relatively sharp rear edge and curved side faces connecting the rear edge with the front edge. For each cross section the distance between the edge portions taken at a cross section across the length direction of the strut, as is shown in FIGS. 14a-14c, is gradually increasing due to the requirement of the diversion of the side faces in the smooth strut area, as expressed above, and due to the necessity of making room for an internal space that may fit an engine mount lug.

In the embodiment shown in FIG. 15, the cross sections of the strut 32 at different radial locations from the connection to the inner ring 28 to the connection to the outer ring all have the shape of an aerodynamic air foil shape including a rounded front edge 46 and a relatively sharp rear edge 48 connected by curved strut faces 41, 42. According to an embodiment of the invention cross sections of the strut 32 at different radial locations at least in the smooth vane area should all have the shape of an aerodynamic air foil shape including a rounded front edge 46 and a relatively sharp rear edge 48 connected by curved strut faces 41, 42.

Alternatively, in another embodiment of the invention cross sections of the strut 32 at different radial locations for at least part of the strut located closer to the end 34 of the strut where the internal space 30 is located than an inner end 45 of the internal space 30 should all have the shape of an aerodynamic air foil shape including a rounded front edge 46 and a relatively sharp rear edge 48 connected by curved strut faces 41, 42. With a relatively sharp rear edge is meant that the curvature radius of the rear edge in the cross sections as shown in FIG. 15 is much smaller than the curvature radius of the front edge for the same cross section. The cross section should be taken along a plane perpendicular to a normal to the inner and outer ring, that is in the radial direction in the event the inner and outer rings are not conical.

In all the embodiments shown the central parts of the first and second opposed strut faces includes the complete opposed strut faces. However, in the event the struts are very long in the axial direction, that is in the direction of the flow in the flow channel in comparison to the length of the recesses provided in the strut, it may be sufficient to only let the opposed end faces diverge in a central part of the strut in a length direction. The central part may for example extend over 50% of the length of the strut in a direction from a front edge to a rear edge. As an illustration the central part may thus extend from cross section A-A to cross section B-B in FIG. 14.

The invention claimed is:

1. A strut for application between an outer ring and an inner ring in a gas turbine structure, wherein an end portion of the strut has a diverging shape so that an internal space is formed in the end portion for receiving at least part of an engine mount, wherein cross sections of the strut taken at different distances from a strut end should, at least in a part of the strut located closer to an end of the strut housing the internal space than an inner end of the internal space, all have a shape of an aerodynamic air foil including a rounded front edge and a relatively sharp rear edge connected by curved strut faces.

2. A strut according to claim 1, wherein at the end portion of the strut at least the central parts of a first and a second opposed strut faces diverge in direction towards a strut end.

3. A strut according to claim 1, wherein the end portion of the strut at least partially has a curved shape.

4. A strut according to claim 3, wherein the curved shape defines a concave surface.

5. A strut according to claim 3, wherein the curved shape has an inflexion line where the end portion changes from being concave to being convex.

6. A strut according to claim 1, wherein the end portion of the strut includes a smooth strut area where edge portions of a cross section of the strut in a plane in the radial direction has a curvature radius which exceeds 0.15 L, where L equals a length of the strut.

7. A strut according to claim 6, wherein a recess is located in the end portion of the strut, the recess being accessible externally of the outer ring, wherein the recess is having a depth D.

8. A strut according to claim 7, wherein the smooth strut area extending from a position located at a distance of D/2 to a distance 2D from an end of the strut.

9. A strut according to claim 6, wherein the edge portions are concave within the smooth strut area.

10. A strut according to claim 9, wherein the curvature radius has its minimum at distance to the end of the strut less than D.

11. A strut according to claim 10, wherein a derivative of the curvature radius is monotonously increasing in the area in a direction outwardly toward the end of the strut.

12. A strut according to claim 6, wherein the edge portions changes from being concave to being convex once within the smooth strut area.

13. A strut according to claim 12, wherein the curvature radius has its minimum value at distance to the end of the strut less than D.

14. A strut according to claim 12, wherein an inflection point at which the edge portions changes from being concave to being convex is located within an inner end area extending from a location located between 5D/6 to 7D/6 from the end of the strut.

15. A strut according to claim 1, wherein the strut end portion comprises a wall which is continuous around the internal space.

16. A strut according to claim 1, wherein the strut forms a one-piece unit.

17. A gas turbine structure comprising an outer ring and an inner ring and a plurality of circumferentially spaced struts extending between the inner ring and the outer ring, wherein at least one of the struts is formed by the strut according to claim 1 and that the end portion is connected to the outer ring.

18. A gas turbine structure according to claim 17, wherein the outer ring comprises at least one radial opening, that the strut is connected to the outer ring so that the internal space in the end portion faces the radial opening and that the gas turbine structure comprises an engine mount, which is positioned in the internal space.

19. A gas turbine structure according to claim 18, wherein the engine mount is positioned at least partially radially inside the outer ring.

20. A strut for application between an outer ring and an inner ring in a gas turbine structure, wherein an end portion of the strut has a diverging shape so that an internal space is formed in the end portion for receiving at least part of an engine mount, wherein cross sections of the strut taken at different distances from a strut end, at least in a part of the strut located closer to an end of the strut housing the internal space than an inner end of the internal space, all have a shape of an aerodynamic air foil including a rounded front edge and a relatively sharp rear edge connected by curved strut faces.

21. A strut according to claim 20, wherein at the end portion of the strut at least the central parts of a first and a second opposed strut faces diverge in direction towards a strut end.

22. A strut according to claim 20, wherein the end portion of the strut at least partially has a curved shape.

23. A strut according to claim 22, wherein the curved shape defines a concave surface.

24. A strut according to claim 22, wherein the curved shape has an inflexion line where the end portion changes from being concave to being convex.

25. A strut according to claim 20, wherein the end portion of the strut includes a smooth strut area where edge portions of a cross section of the strut in a plane in the radial direction has a curvature radius C which exceeds 0.15 L, where L equals a length of the strut.

26. A strut according to claim 25, wherein a recess is located in the end portion of the strut, the recess being accessible externally of the outer ring, wherein the recess is having a depth D.

27. A strut according to claim 26, wherein the smooth strut area extending from a position located at a distance of D/2 to a distance 2D from an end of the strut.

28. A strut according to claim 25, wherein the edge portions are concave within the smooth strut area.

29. A strut according to claim 28, wherein the curvature radius C has its minimum at distance to the end of the strut less than D.

30. A strut according to claim 29, wherein a derivative of the curvature radius C is monotonously increasing in the area in a direction outwardly toward the end of the strut.

31. A strut according to claim 25, wherein the edge portions changes from being concave to being convex once within the smooth strut area.

32. A strut according to claim 31, wherein the curvature radius C has its minimum value at distance to the end of the strut less than D.

33. A strut according to claim 31, wherein an inflection point at which the edge portions changes from being concave to being convex is located within an inner end area extending from a location located between 5D/6 to 7D/6 from the end of the strut.

34. A strut according to claim 20, wherein the strut end portion comprises a wall which is continuous around the internal space.

35. A strut according to claim 20, the strut forms a one-piece unit.

36. A gas turbine structure comprising an outer ring and an inner ring and a plurality of circumferentially spaced struts extending between the inner ring and the outer ring wherein at least one of the struts is formed by the strut according to claim 20 and the end portion is connected to the outer ring.

37. A gas turbine structure according to claim 36, wherein the outer ring comprises at least one radial opening, that the strut is connected to the outer ring so that the internal space in the end portion faces the radial opening and that the gas turbine structure comprises an engine mount, which is positioned in the internal space.

38. A gas turbine structure according to claim 37, wherein the engine mount is positioned at least partially radially inside the outer ring.

* * * * *